(12) United States Patent
Farooq et al.

(10) Patent No.: US 11,872,948 B2
(45) Date of Patent: Jan. 16, 2024

(54) MULTI-CHAMBER CURTAIN AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 17/548,883

(22) Filed: Dec. 13, 2021

(65) Prior Publication Data

US 2023/0182674 A1 Jun. 15, 2023

(51) Int. Cl.
*B60R 21/214* (2011.01)
*B60R 21/231* (2011.01)

(52) U.S. Cl.
CPC ...... *B60R 21/214* (2013.01); *B60R 21/23138* (2013.01)

(58) Field of Classification Search
CPC ............ B60R 21/214; B60R 21/23138; B60R 21/213; B60R 21/2338
See application file for complete search history.

(56) References Cited

U.S. PATENT DOCUMENTS

| | | | |
|---|---|---|---|
| 9,809,189 B2 | 11/2017 | Grell et al. | |
| 9,969,346 B2 | 5/2018 | Patel et al. | |
| 10,471,923 B2 * | 11/2019 | Jimenez | B60R 21/232 |
| 10,899,306 B2 | 1/2021 | Deng et al. | |
| 11,124,148 B2 * | 9/2021 | Zischka | B60N 2/6009 |
| 2003/0090091 A1 * | 5/2003 | Dominissini | B60R 21/232 280/730.2 |
| 2015/0203066 A1 * | 7/2015 | Pausch | B60R 21/232 280/730.1 |
| 2015/0375704 A1 * | 12/2015 | Jaradi | B60R 21/08 280/749 |

(Continued)

FOREIGN PATENT DOCUMENTS

| | | | | |
|---|---|---|---|---|
| CN | 105946778 A | * | 9/2016 | ........... B60R 21/213 |
| DE | 102010032449 A1 | * | 2/2012 | ........... B60N 2/4235 |

(Continued)

OTHER PUBLICATIONS

Bernzen et al. DE10 2010 032449, Machine English Translation, ip.com (Year: 2012).*

(Continued)

*Primary Examiner* — Karen Beck
(74) *Attorney, Agent, or Firm* — Frank A. MacKenzie; Bejin Bieneman PLC

(57) ABSTRACT

An assembly for a vehicle includes a roof and a headliner. The vehicle includes a seat having an occupant seating area. The vehicle includes a curtain airbag. The curtain airbag includes an extension. The curtain airbag is inflatable from an uninflated position to an inflated position. The curtain airbag is between the roof and the headliner in the uninflated position. The curtain airbag is inflatable downwardly from the headliner to the inflated position. In the inflated position, the curtain airbag has a main chamber and the extension extending cross-vehicle from the main chamber and vehicle-forward of the occupant seating area.

19 Claims, 6 Drawing Sheets

(56) References Cited

U.S. PATENT DOCUMENTS

2016/0229370 A1* 8/2016 Hampson ............ B60R 21/2334
2017/0225641 A1* 8/2017 Faruque ................. B60N 2/143

FOREIGN PATENT DOCUMENTS

| DE | 102012213284 A1 * | 2/2014 | ........... B60R 21/207 |
| DE | 102019126749 A1 * | 4/2021 | |
| DE | 102019126749 A1 | 4/2021 | |
| WO | WO-2005115795 A2 * | 12/2005 | ........... B60R 21/026 |

OTHER PUBLICATIONS

Heigl, DE 10 2019 126749 Machine English translation, ip.com (Year: 2021).*

* cited by examiner

MULTI-CHAMBER CURTAIN AIRBAG

BACKGROUND

During a vehicle impact, occupants may move in a direction influenced by the momentum of a vehicle. Some vehicle impacts, e.g., side impact, frontal offset impacts, far side oblique impacts, near side oblique impacts, etc., may cause the occupants to move cross-vehicle and/or at an angle toward vehicle components, e.g., toward a pillar, door, etc. Occupant injury risk is dependent upon specific crash scenarios and the interaction of an occupant with vehicle components.

DETAILED DESCRIPTION

Figure 1:
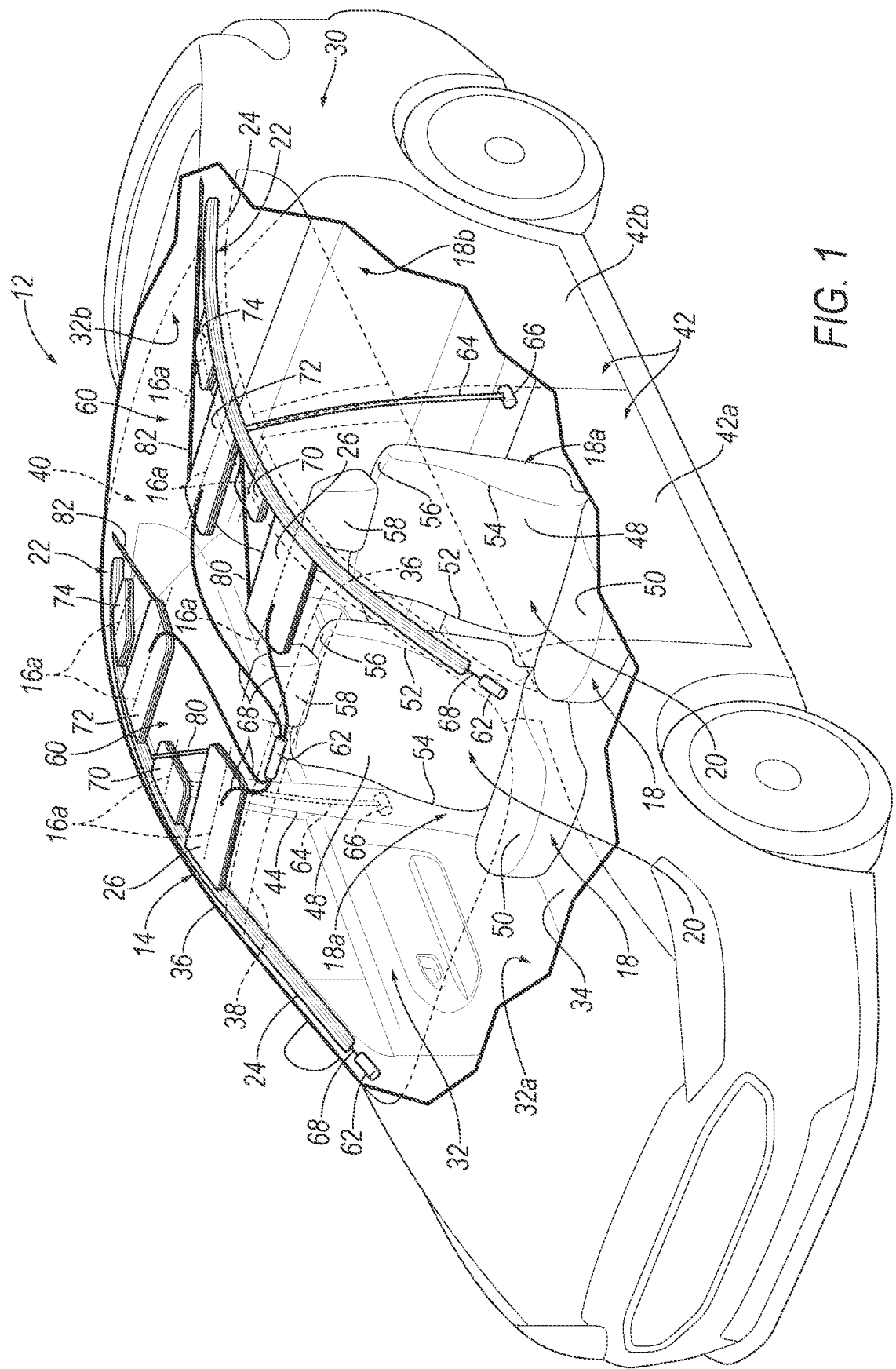
FIG. 1 is a perspective view of a vehicle including an airbag assembly in the uninflated position.
Figure 2:
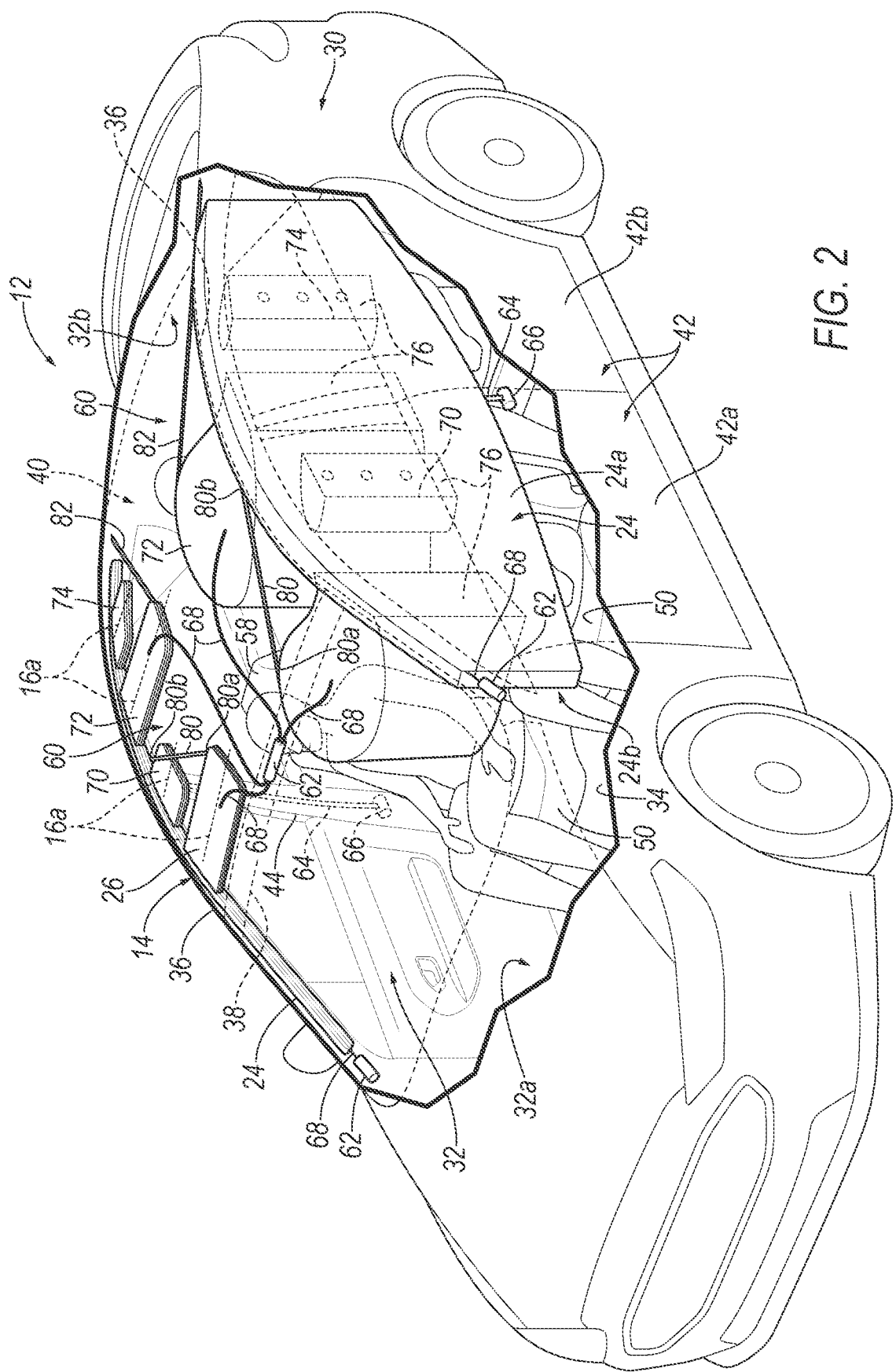
FIG. 2 is a perspective view of an example of the airbag assembly in the inflated position including fill tubes and a tether and a second tether.
Figure 3:
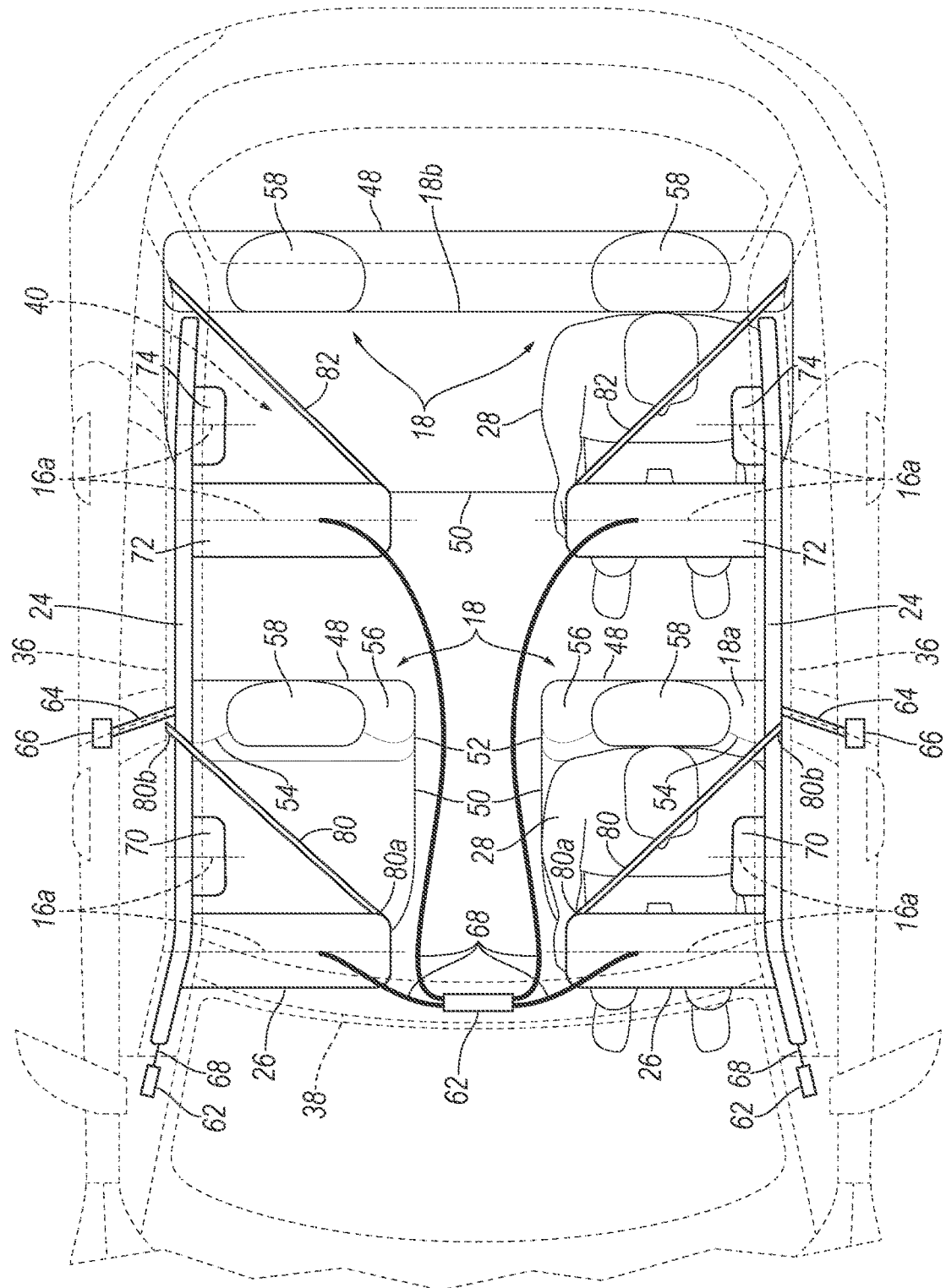
FIG. 3 is a top view of the vehicle including the example of the airbag assembly in the uninflated position having fill tubes and a tether and a second tether.
Figure 4:
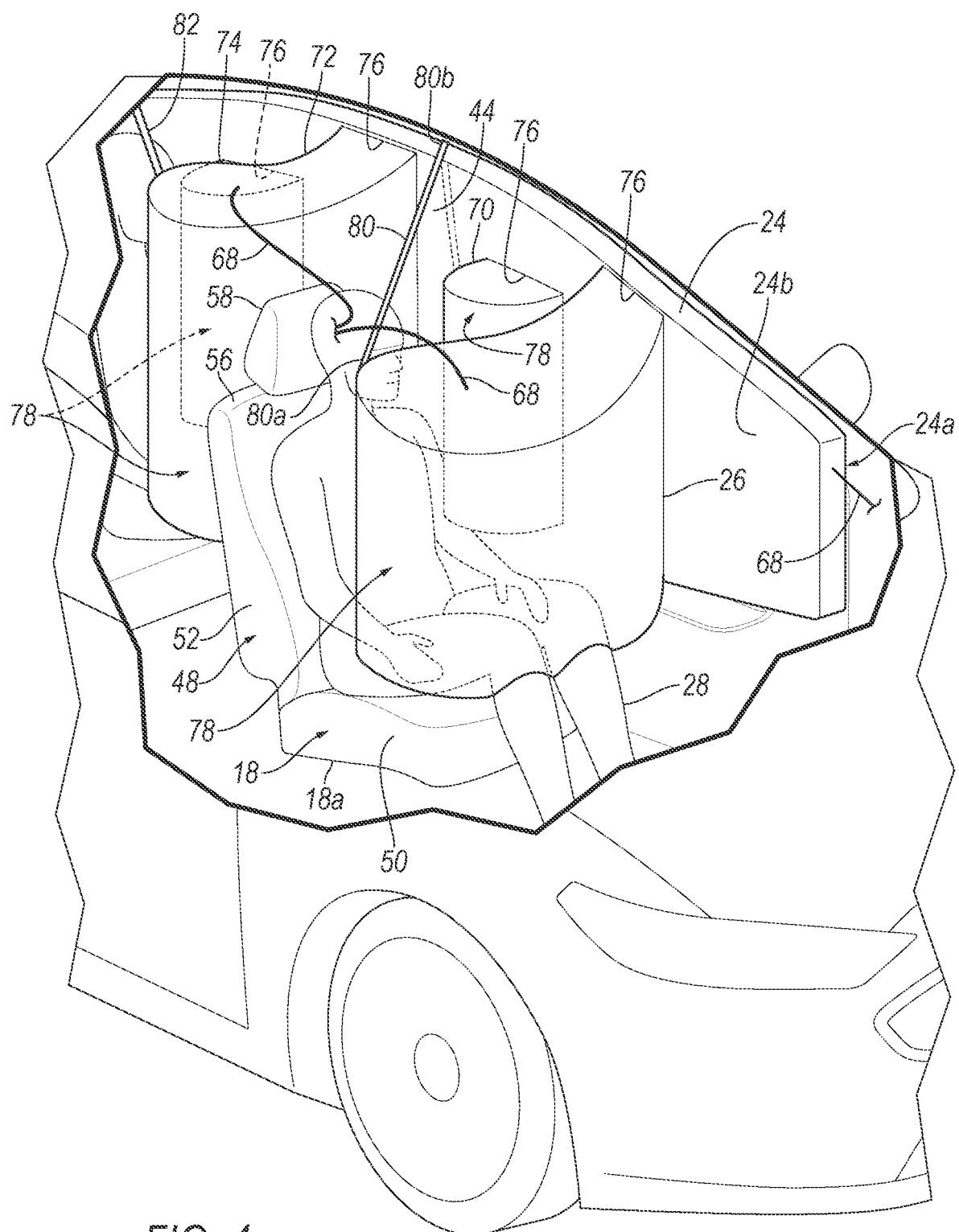
FIG. 4 is a perspective view including the example of the airbag assembly in the inflated position for a front seat.
Figure 5:
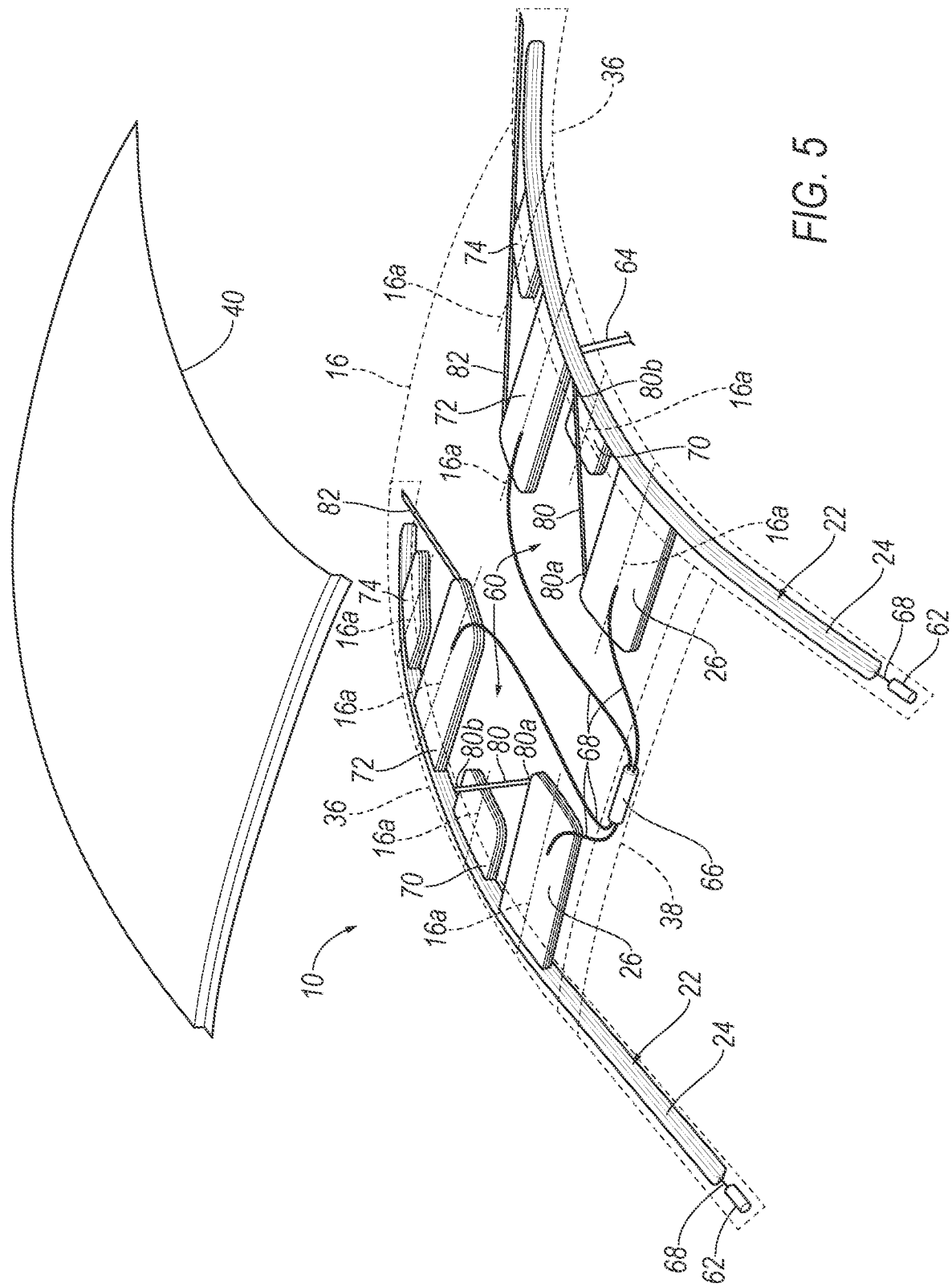
FIG. 5 is an exploded view of a vehicle roof and a headliner with a curtain airbag in the uninflated position.
Figure 6:
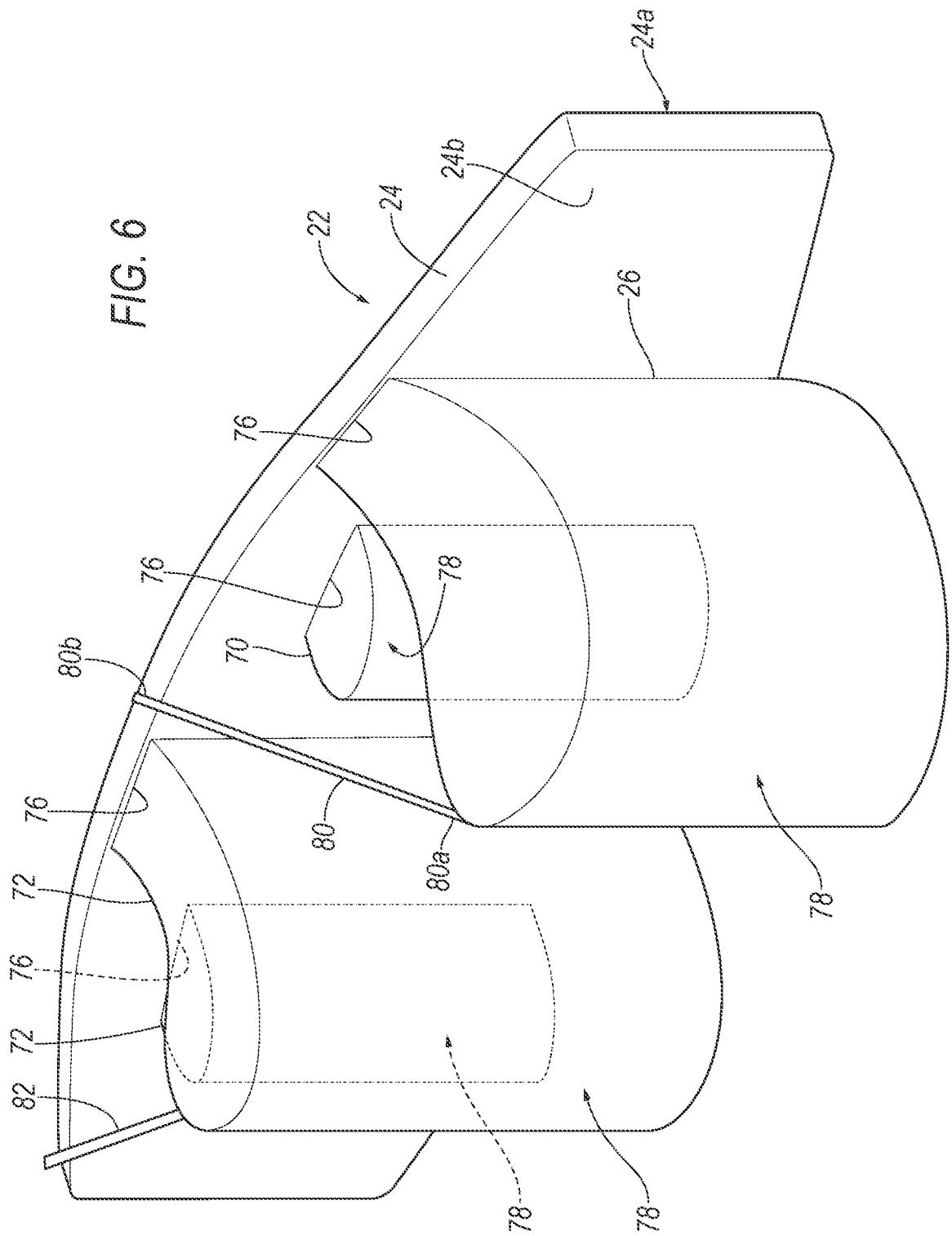
FIG. 6 is a perspective view of the curtain airbag.

An assembly for a vehicle includes a roof and a headliner. The vehicle includes a seat having an occupant seating area. The vehicle includes a curtain airbag. The curtain airbag includes an extension. The curtain airbag is inflatable from an uninflated position to an inflated position. The curtain airbag is between the roof and the headliner in the uninflated position. The curtain airbag is inflatable downwardly from the headliner to the inflated position. In the inflated position, the curtain airbag has a main chamber and the extension extending cross-vehicle from the main chamber and vehicle-forward of the occupant seating area.

The extension may be elongated cross-vehicle in the uninflated position.

The headliner may have a tear seam elongated cross-vehicle, the tear seam being aligned with the extension.

The vehicle may include a retractor disposed below the curtain airbag in the uninflated position and a tether extending from the retractor to the curtain airbag.

The curtain airbag may include a second extension extending cross-vehicle from the main chamber in the inflated position, the second extension being vehicle-rearward of the extension.

The seat may include a seatback, the second extension being between the extension and the seatback in the inflated position.

The seatback may include a first bolster and a second bolster, the first bolster being inboard of the second bolster with the occupant seating area defined therebetween, the extension extending from the main chamber to the first bolster and the second extension extending from the main chamber to the second bolster.

The seat may include a seat bottom and the seatback may include a top, the second extension extending from the top to the seat bottom in the inflated position.

The seat may include a seat bottom, the curtain airbag extending below the seat bottom in the inflated position.

The vehicle may include a second seat having an occupant seating area and spaced from the seat along the vehicle-longitudinal axis, the curtain airbag having a third extension extending from the main chamber, the third extension being between the seat and the occupant seating area of the second seat in the inflated position.

The curtain airbag may include a fourth extension extending from the main chamber adjacent to the occupant seating area of the second seat.

The vehicle may include a retractor disposed below the curtain airbag in the inflated position and a tether extending from the retractor to the curtain airbag.

The retractor may be pyrotechnically actuated.

The vehicle may include a vehicle body including a middle pillar, the retractor being fixed to the middle pillar.

The vehicle may include a vehicle body including a middle pillar and a tether connected to the middle pillar and the extension.

The vehicle may include a vehicle door, the main chamber of the curtain airbag including a first panel facing the vehicle door in the inflated position and a second panel opposite the first panel, the extension extending from the second panel.

With reference to the Figures, wherein like numerals indicate like parts throughout the several views, an assembly 10 for a vehicle 12 is generally shown. The vehicle 12 includes a roof 14 and a headliner 16. The vehicle 12 includes a seat 18 having an occupant seating area 20. The vehicle 12 includes a curtain airbag 22. The curtain airbag 22 includes an extension 26. The curtain airbag 22 is inflatable from an uninflated position to an inflated position. The curtain airbag 22 is between the roof 14 and the headliner 16 in the uninflated position. The curtain airbag 22 is inflatable downwardly from the headliner 16 to the inflated position. In the inflated position, the curtain airbag 22 has a main chamber 24 and the extension 26 extending cross-vehicle from the main chamber 24 and vehicle-forward of the occupant seating area 20.

The curtain airbag 22 is inflatable from the uninflated position to the inflated position to control the kinematics of a vehicle occupant 28. Specifically, since the extension 26 extends cross-vehicle from the main chamber 24 and vehicle-forward of the occupant seating area 20 in the inflated position, the occupant 28 is between the seat 18 and the extension 26 to control the kinematics of the occupant 28. Because the curtain airbag 22 includes the main chamber 24 and the extension 26, the curtain airbag 22 can control the kinematics of the occupant 28 in a vehicle impact from several directions, e.g., front impact, oblique impact, side impact, etc., and can eliminate the need for other airbags to control the kinematics of such impact modes. Because the curtain airbag 22 inflates downwardly from the headliner 16, the extension 26 can be shaped and sized based on the contours of the occupant seating area 20 and other vehicle components and the position of the airbag between the roof 14 and the headliner 16 in the uninflated position allows for packaging of such shapes and sizes.

The vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 includes a vehicle frame (not numbered). The vehicle frame may be of a unibody construction in which the frame is unitary with a vehicle body 30 including frame rails, rockers, pillars 44, roof rails 36, etc. As another example, the frame and body may have any suitable construction. The frame and body may be of any suitable material, for example, steel, aluminum, and/or fiber-reinforced plastic, etc.

The vehicle body 30 defines a passenger compartment 32 to house occupants 28, if any, of the vehicle 12. The passenger compartment 32 may extend across the vehicle 12, i.e., from one side to the other side of the vehicle 12. The passenger compartment 32 includes a front end 32a and a rear end 32b with the front end 32a being in front of the rear end 32b during forward movement of the vehicle 12. The front end 32a of the passenger compartment 32 may include an instrument panel (not numbered) and vehicle controls (not numbered).

The vehicle body 30 includes a floor 34 and the roof 14. The roof 14 may define the upper boundary of the body and may extend from the front end 32a of the passenger compartment 32 to the rear end 32b of the passenger compartment 32. The floor 34 is below from the roof 14. The floor 34 may define the lower boundary of the vehicle body 30 and may extend from the front end 32a of the passenger compartment 32 to the rear end 32b of the passenger compartment 32.

The roof 14 may include roof rails 36, one or more roof bows 38, and a roof panel 40. The roof rails 36 may be elongated in the vehicle 12 fore-and-aft direction. The roof 14 may include two roof rails 36 with one roof rail 36 at one side of the roof 14 and the other roof rail 36 at the other side of the roof 14. The roof bow 38 may be elongated in the cross-vehicle direction from one roof rail 36 to another roof rail 36.

The roof panel 40 is disposed above the roof rails 36 and the roof bows 38 and is supported by the roof rails 36 and/or the roof bows 38. The roof panel 40 has a class-A surface, a finished surface exposed to view by a customer and free of unaesthetic blemishes and defects. Specifically, the class-A surface faces outwardly to the exterior of the vehicle 12. The roof rails 36, the roof bows 38, and/or the roof panel 40 may be metal (e.g., aluminum, steel, etc.), composite material, e.g., fiber reinforced thermoplastic, sheet molding compound (SMC), etc., or any suitable material.

The headliner 16 may be supported by the vehicle body 30. Specifically, the headliner 16 may be supported by the roof 14, e.g., the roof rails 36 and/or the roof bows 38. The headliner 16 is above the passenger compartment 32 and below the roof 14, i.e., the headliner 16 is between the passenger compartment 32 and the roof 14. The headliner 16 and the roof 14 (e.g., the roof rails 36, roof bows 38, and/or roof panel 40) may define one or more cavities that house the curtain airbag 22 in the uninflated position, as described further below. The headliner 16 may define the upper boundary of the passenger compartment 32. The headliner 16 may conceal the roof 14 from inside the passenger compartment 32. The headliner 16 includes a class-A surface facing the passenger compartment 32, i.e., a surface specifically manufactured to have a high quality, finished, aesthetic appearance free of blemishes. The headliner 16 may be one of or any combination of, for example, plastic, foam, upholstery, etc.

The vehicle 12 includes at least one door 42 openable relative to the vehicle body 30 for occupants 28 to enter and exit a passenger compartment 32. In the example shown in the figures, the vehicle 12 includes a front door 42a and a rear door 42b. In such an example the front door 42a provides access to a front row of the passenger compartment 32 and the rear door 42b provides access to a rear row of the passenger compartment 32.

The vehicle body 30 may include pillars 44. The pillars 44 may extend from the roof 14 to the floor 34. Specifically, the vehicle body 30 may include pillars 44 on both sides of the vehicle 12. In the example shown in the figures, each side of the vehicle 12 includes an A-pillar, B-pillar, and C-pillar. The A-pillars may extend between the windshield and the front doors 42a. In other words, the A-pillars may be disposed at the front end 32a of the passenger compartment 32. The B-pillars may extend between the front door 42a and the rear door 42b, i.e., between adjacent doors 42. The vehicle 12 may include additional pillars 44, e.g., D-pillars.

The vehicle 12 may include a plurality of seats 18 arranged in any suitable manner in the passenger compartment 32. In the examples shown in the figures, the plurality of seats 18 includes two front seats 18, e.g., a driver's seat and a passenger's seat, and two rear seats 18. Specifically, the vehicle 12 includes a first seat 18a, e.g., a driver's seat, and a second seat 18b spaced vehicle-rearward of the first seat 18a on the vehicle-longitudinal axis, e.g., a rear passenger's seat. The seat 18 may be movable relative to the floor 34 to various positions, e.g., movable fore-and-aft and/or cross-vehicle. The seat 18 may be of any suitable type, e.g., a bucket seat 18 as shown in the Figures.

The seat 18 may include a seatback 48 and a seat bottom 50. The seatback 48 may be supported by the seat bottom 50 and may be stationary or movable relative to the seat bottom 50. The seatback 48 and the seat bottom 50 may be adjustable in multiple degrees of freedom.

The seat 18 includes the occupant seating area 20. The occupant seating area 20 is the area occupied by an occupant 28 when properly seated on the seat 18. The occupant seating area 20 is in a seat-forward direction of the seatback 48 and above the seat bottom 50.

The seatback 48 may have a first bolster 52 and a second bolster 54 on opposite sides of the occupant seating area 20. As shown in the Figures, the first bolster 52 is inboard of the second bolster 54. The first bolster 52 and the second bolster 54 are elongated, and specifically, are elongated in a generally upright direction when the seatback 48 is in a generally upright position. The first bolster 52 and the second bolster 54 define cross-seat boundaries of the seatback 48, i.e., the seatback 48 terminates at the first bolster 52 and the second bolster 54. The first bolster 52 and the second bolster 54 may extend in a seat-forward direction relative to the occupant seating area 20, i.e., on opposite sides of the torso and shoulders of an occupant 28 seated on the seat 18. The extension of the first bolster 52 and the second bolster 54 relative to the occupant seating area 20 may be defined by upright frame members and/or a covering of the seat 18.

The seatback 48 includes a top 56. As shown in the figures, the top 56 of the seatback 48 extends from the first bolster 52 to the second bolster 54. The seatback 48 is elongated from the seat bottom 50 to the top 56 of the seatback 48. The vehicle 12 may include a head restraint 58. In the example shown in the Figures, the head restraint 58 is supported on the seat 18. Specifically, the head restraint 58 is supported on the top 56 of the seatback 48.

The vehicle 12 includes an airbag assembly 60. The airbag assembly 60 includes the curtain airbag 22 and an inflator 62. The airbag assembly 60 may include at least one tether 64 and a retractor 66. In the example shown in the figures, the vehicle 12 includes two curtain airbags 22, i.e., one on either side of the vehicle 12. In such an example, the vehicle 12 may include two airbag assemblies 60 each including one of the curtain airbags 22 and a corresponding inflator 62, tether 64, retractor 66, etc. In other examples, the two curtain airbags 22 may be components of a single airbag assembly 60 and/or may share one or more of the inflator 62, tether 64, retractor 66, etc.

The inflator 62 inflates the curtain airbag 22 to the inflated position, as described further below. As described above, the curtain airbag 22 includes the main chamber 24 and the extension 26 protruding from the main chamber 24 in the inflated position. In the example shown in the figures, the curtain airbag 22 includes a second extension 70. In response to a vehicle impact, the inflator 62 inflates the curtain airbag 22 to the inflated position. During inflation, the curtain airbag 22 ruptures the tear seams 16a in the headliner 16 and inflates downwardly. The extension 26 is positioned vehicle-forward of the occupant seating area 20 to control the kinematics of an occupant 28 in the seat 18, e.g., to control forward movement of the occupant 28 during a frontal impact. In examples where the impact to the vehicle 12 is a side-impact, the main chamber 24 controls the kinematics of the occupant 28, and the door 42 is the reaction surface for the curtain airbag 22. In examples with the second extension 70, the second extension 70 controls the kinematics of the occupant 28 during a side impact. Specifically, the second extension 70 limits the outboard movement of the occupant 28. During an oblique or a frontal impact, the extension 26 controls the kinematics of the occupant 28 and the instrument panel is a reaction surface for the curtain airbag 22. In examples where the tether 64 is connected to the middle-pillar 44 and the extension 26, the tether 64 aids in control of the position of the extension 26.

The inflator 62 is in fluid communication with the curtain airbag 22 to inflate the curtain airbag 22. The inflator 62 expands the curtain airbag 22 with an inflation medium, such as a gas, to move the curtain airbag 22 from the uninflated position to the inflated position. The inflator 62 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 62 may be, for example, supported on the roof 14. Specifically, as shown in the Figures, the inflator 62 may be fixed to the roof bow 38, e.g., with fasteners. The airbag assembly 60 may include a second inflator 62 supported on one of the pillars 44, e.g., an A-pillar. As shown in the figures, the second inflator 62 may be fixed to the A-pillar, e.g., with fasteners.

The airbag assembly 60 may include fill tubes 68. The fill tubes 68 extend from the inflator 62 to the curtain airbag 22. The fill tubes 68 fluidly connect the inflator 62 and the curtain airbag 22. Specifically, the fill tubes 68 fluidly connect the inflator 62 to the main chamber 24, the first extension 26, a third extension 72. In the example shown in the Figures, the fill tubes 68 extend from the inflator 62 to the curtain airbag 22 between the headliner 16 and the roof 14.

The curtain airbag 22 may have a plurality of extensions 26, 70, 72, 74. In the example shown in the figures, the curtain airbag 22 includes the third extension 72 and the fourth extension 74. The first extension 26 and the second extension 70 are paired for controlling the kinematics of an occupant 28 of one of the seats 18 and the third extension 72 and the fourth extension 74 are paired for controlling the kinematics of an occupant 28 of another of the seats 18. The third extension 72 and the fourth extension 74 perform the same function as the first extension 26 and the second extension 70, respectively, and may have identical or similar structure to the first extension 26 and the second extension 70, respectively, with the difference being the position of the extensions 26, 70, 72, 74 for controlling the kinematics of occupants 28 of different seats 18. In the example shown in the figures, the first extension 26 and second extension 70 are positioned to control the kinematics of an occupant 28 in one of the front seats 18 and the third extension 72 and fourth extension 74 are positioned to control the kinematics of an occupant 28 in one of the rear seats 18. More specifically, in the example in the figures, one of the curtain airbags 22 includes the four extensions 26, 70, 72, 74 for controlling the kinematics of occupants 28 in the front and rear seats 18 on one side of the vehicle 12 and the other of the curtain airbags 22 includes four extensions 26, 70, 72, 74 for controlling the kinematics of occupants 28 in the front and rear seats 18 on the other side of the vehicle 12. The adjectives "first," "second," "third," and "fourth" are used herein as identifiers and do not indicate order or importance.

The curtain airbag 22 is between the roof 14 and the headliner 16 in the uninflated position. For example, the curtain airbag 22 may be in the cavity between the headliner 16 and the roof 14 in the uninflated position. In such an example, the headliner 16 separates the curtain airbag 22 from the passenger compartment 32 and the curtain airbag 22 breaks through the headliner 16 and into the passenger compartment 32 when inflated to the inflated position. In the uninflated position, the curtain airbag 22 may be rolled and/or folded between the headliner 16 and the roof 14. For example, in the uninflated position, the curtain airbag 22 may be elongated along the longitudinal axis.

The curtain airbag 22 may be supported by the headliner 16 and/or the roof 14, e.g., the roof bows 38 and/or roof rails 36, in the uninflated position. In other words, the weight of the curtain airbag 22 is borne by the headliner 16 and/or the roof 14 in the uninflated position.

As shown in the Figures and introduced above, the curtain airbag 22 includes the main chamber 24. The curtain airbag 22 extends downwardly from the headliner 16 in the inflated position. Specifically, the main chamber 24 inflates downwardly from the headliner 16. The curtain airbag 22, e.g., the main chamber 24 of the curtain airbag 22, may extend below the seat bottom 50 in the inflated position. The main chamber 24 may be inflated by the inflator 62, e.g., by direction connection with the inflator 62 or through the fill tubes 68, and the main chamber 24 may deliver inflation medium from the inflator 62 to the extensions 26, 70, 72, 74. In other words, in such an example, the extensions 26, 70, 72, 74 are inflated through the main chamber 24.

The main chamber 24 may be adjacent the front door 42a and/or the rear door 42b in the inflated position. The main chamber 24 may include a first panel 24a and a second panel 24b. As shown in the Figures, the first panel 24a faces the vehicle door 42 in the inflated position and the second panel 24b is opposite the first panel 24a. The first panel 24a may face the front door 42a and/or the rear door 42b. The second panel 24b faces inboard, i.e., the passenger compartment 32.

The main chamber 24 may be of any suitable length (e.g., a suitable length to be adjacent the front door 42a and the rear door 42b, adjacent the front door 42a, or adjacent the rear door 42b). As an example shown in the Figures, the main chamber 24 is adjacent the front door 42a and the rear door 42b. In the example shown in the figures, the main chamber 24 extends vehicle forward and vehicle rearward from the middle pillar 44 along the longitudinal axis of the vehicle 12, i.e., is adjacent the front door 42a and the rear door 42b.

In the example shown in the figures, the curtain airbag 22 includes a plurality of extensions 26, 70, 72, 74, namely the extension 26, the second extension 70, the third extension 72, and the fourth extension 74. Each of the extensions 26, 70, 72, 74 is supported on the main chamber 24 at a proximal end 76 of the extension 26, 70, 72, 74. Specifically, each of the extensions 26, 70, 72, 74 are connected to the main chamber 24 at the proximal end 76 of the extension 26, 70, 72, 74. As shown in the figures, each of the extensions 26, 70, 72, 74 is connected to the second panel 24b at the proximal end 76. The extensions 26, 70, 72, 74 may be connected to the main chamber 24 in any suitable manner, e.g., sewn, welded, etc. Each of the extensions 26, 70, 72, 74 extends from the main chamber 24 to an inboard face 78 of the extension 26, 70, 72, 74. The inboard face 78 is spaced from the proximal end 76 of the extensions 26, 70, 72, 74 and the main chamber 24 along the cross-vehicle axis in the inflated position.

The main chamber 24 and the plurality of extensions 26, 70, 72, 74 may be fluidly connected. In other words, the inflation medium may enter the extensions 26, 70, 72, 74 through the main chamber 24. As one example, the main chamber 24 may include an opening and the extensions 26, 70, 72, 74 are connected at the proximal end 76 around the opening. As shown in the Figures, the second extension 70 and the fourth extension 74 are fluidly connected to the main chamber 24 and the first extension 26 and the third extension 72 are fluidly isolated from the main chamber 24. In the examples shown in the Figures, the first extension 26 and the third extension 72 are fluidly connected to the inflator 62 by the fill tubes 68.

The extensions 26, 70, 72, 74 extend cross-vehicle from the main chamber 24. The extensions 26, 70, 72, 74 may be elongated cross-vehicle in the uninflated position. As another example, not shown in the figures, the second extension 70 and the fourth extension 74 may be packaged with the main chamber 24 in the uninflated position, e.g., rolled with the main chamber 24. The extensions 26, 70, 72, 74 extend inboard from the main chamber 24 in the inflated position. Specifically, the extensions 26, 70, 72, 74 extend from the second panel 24b from the proximal end 76 to the inboard face 78.

As shown in the Figures, the extension 26 (and the third extension 72) extends cross-vehicle in front of the occupant seating area 20, i.e., vehicle-forward of the occupant seating area 20. When an occupant 28 occupies the seat 18, the extension 26 extends in front of the occupant 28. Specifically, the extension 26 in the inflated position is between the occupant seating area 20 and the instrument panel. The third extension 72 in the inflated position is between the occupant seating area 20 of the rear seat 18 and the seatback 48 of the front seat 18.

The extension 26 (and the third extension 72) may extend cross-vehicle to the first bolster 52. In the example shown in the Figures, the inboard face 78 is aligned with the first bolster 52. The extension 26 extends from the main chamber 24 to the first bolster 52 in front of the occupant seating area 20. In other words, the extension 26 is spaced from the first bolster 52 and the inboard face 78 is aligned with the first bolster 52 on the vehicle longitudinal axis.

The extension 26 may be between the front end 32a of the passenger compartment 32 and the occupant seating area 20. Specifically, the front end 32a of the passenger compartment 32 may act as the reaction surface for the extension 26 in the event of a vehicle impact.

The extension 26 (and the third extension 72) may extend downwardly below the seat bottom 50 in the inflated position. In some examples, the extension 26 may extend to the floor 34, i.e., in the inflated position the extension 26 abuts the floor 34.

As set forth above, the third extension 72 may be identical to or similar to the extension 26. The main chamber 24 may be elongated along the vehicle longitudinal axis and the third extension 72 is positioned vehicle-rearward of the extension 26. The third extension 72 may be of similar function and structure to the extension 26 and positioned on the main chamber 24 relative to the second seat 18b. In other words, the third extension 72 is positioned relative to the second seat 18b, as the extension 26 is positioned relative to the first seat 18a. The third extension 72 may have structural differences from the extension 26 to accommodate the contours of the passenger compartment 32. As one example, the extension 26 is between the occupant seating area 20 of the first seat 18a and the front end 32a of the passenger compartment 32, while the third extension 72 is between the occupant seating area 20 of the second seat 18b and the seatback 48 of the first seat 18a.

As shown in the Figures, the second extension 70 (and the fourth extension 74) extends cross-vehicle from the main chamber 24 in the inflated position. The second extension 70 extends from the second panel 24b from the proximal end 76 to the inboard face 78. As shown in the figures, the second extension 70 is vehicle-rearward of the extension 26 in the inflated position. The second extension 70 is adjacent the occupant seating area 20 in the inflated position. Specifically, the second extension 70 is between the extension 26 and the seatback 48 in the inflated position.

In the examples shown in the figures, the second extension 70 includes the inboard face 78. The inboard face 78 of the second extension 70 may be aligned with the second bolster 54 along the longitudinal axis of the vehicle 12. As shown in the figures, the second extension 70 may extend from the main chamber 24 to the second bolster 54. The second extension 70 may be adjacent the occupant seating area 20 along the longitudinal axis of the vehicle 12. As an example shown in the figures, the second extension 70 may extend vehicle-forward from the second bolster 54 along the occupant seating area 20.

The second extension 70 may be at the seat bottom 50 in the inflated position. For example, the second extension 70 may extend from the top 56 of the seatback 48 to the seat bottom 50 in the inflated position. As shown in the Figures, the second extension 70 is sized and shaped to control the kinematics of the occupant's 28 torso during a vehicle impact. As an example, during a side-impact, the occupant's 28 torso may impact the second extension 70.

As set forth above, the fourth extension 74 may be identical to or similar to the second extension 70. The main chamber 24 may be elongated along the vehicle longitudinal axis and the fourth extension 74 is positioned vehicle-rearward of the second extension 70. The fourth extension 74 may be of similar function and structure to the second extension 70 and positioned on the main chamber 24 relative to the second seat 18b. In other words, the fourth extension 74 is positioned relative to the second seat 18b, as the second extension 70 is positioned relative to the first seat 18a. For example, the fourth extension 74 is positioned adjacent the occupant seating area 20 of the second seat 18b. The fourth extension 74 may have structural differences from the second extension 70 to accommodate the contours of the passenger compartment 32.

As described above, the headliner 16 includes at least one tear seam 16a elongated cross-vehicle. The tear seam 16a is positioned to be broken by the curtain airbag 22 as the curtain airbag 22 inflates and extends through the tear seams 16a into the passenger compartment 32. The tear seam 16a may be aligned with one of the extensions 26, 70, 72, 74 along the longitudinal axis of the vehicle 12. In the example shown in the figures, the headliner 16 includes multiple tear seams 16a, namely one tear seam 16a aligned respectively with each of the extension 26, the second extension 70, the third extension 72, and the fourth extension 74, respectively, in the uninflated position. During inflation, the extensions 26, 70, 72, 74 rupture their respective tear seams 16a and inflate downwardly from the roof 14.

The curtain airbag 22 may be fabric, e.g., a woven polymer. As an example, the curtain airbag 22 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The airbag assembly 60 may include the retractor 66 and the tether. As shown in the figures, the retractor 66 may be supported on the middle pillar 44. Specifically, the retractor 66 is fixed to the middle pillar 44. The retractor 66 is fixed to the middle pillar 44 below the curtain airbag 22 in the uninflated position. The tether 64 extends from the retractor 66 to the curtain airbag 22. As shown in the figures, the tether 64 may extend from the retractor 66 to the main chamber 24.

The retractor 66 may be pyrotechnically actuated. In the event of a vehicle impact, the retractor 66 retracts the tether 64. Specifically, the retractor 66 retracts the tether 64, and the tether 64 pulls the main chamber 24 downwardly during inflation. The retractor 66 and the tether 64 may assist, for example, with positioning the curtain airbag 22 during a vehicle impact. The retractor 66 retracts the tether 64 continuously until the curtain airbag 22 is in the inflated position. The retractor 66 may be any suitable type of retractor 66, for example a pyrotechnic rotary pretensioner.

The airbag assembly 60 may include tethers 80, 82 extending from the vehicle body 30 to the curtain airbag 22. For example, the airbag assembly 60 may include a second tether 80 connected to the middle pillar 44 and the extension 26. In the example shown in the figures, the second tether 80 has a first end 80a and a second end 80b spaced from the first end 80a. The first end 80a of the second tether 80 is connected to the extension 26. The first end 80a of the second tether 80 may be connected to the extension 26 directly, e.g., the first end 80a may be sewn into the extension 26, or indirectly. The first end 80a of the second tether 80 connects to the extension adjacent the inboard face 78. middle pillar 44. The first end 80a of the second tether 80 may be connected to the middle pillar 44 directly, e.g., by using fasteners, or indirectly. As shown in the Figures, the second end 80b of the second tether 80 is connected to the middle pillar 44. The second end 80b of the second tether 80 may be connected to the middle pillar 44 directly, e.g., by using fasteners, or indirectly.

As another example, in addition to or in the alternative to the second tether 80, the airbag assembly 60 may include a third tether 82 connected to a pillar 44 of the vehicle body 30 that is rearward of the B-pillar, e.g., the C-pillar. In the example shown in the figures, the third tether 82 may have a first end (not numbered) and a second end (not numbered) spaced from the first end. As shown in the Figures, the first end of the third tether 82 is connected to the third extension 72. The first end of the third tether 82 may be connected to the third extension 72 directly, e.g., the first end may be sewn into the third extension 72, or indirectly. The first end of the third tether 82 connects to the third extension 72 adjacent the inboard face 78. The second end of the third tether 82 is connected to a pillar 44 that vehicle-rearward of the middle pillar 44, e.g., the C-pillar. The second end of the third tether 82 may be connected to the pillar 44 directly, e.g., by using fasteners, or indirectly.

The tether 64, the second tether 80, and the third tether 82 may be of any suitable material, e.g., fabric woven polymer. For example, the fabric may be woven nylon yarn, for example, nylon 6,6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane. The tethers 64, 80, 82 and the curtain airbag 22 may be of the same material.

This disclosure has been described in an illustrative manner, and it is to be understood that the terminology which has been used is intended to be in the nature of words of description, rather than limitation. Many modifications and variations of the present disclosure are possible in light of the above teachings, and the disclosure may be practiced otherwise than as specifically described.

The invention claimed is:

1. A vehicle comprising:
a roof;
a headliner;
a seat having an occupant seating area;
a curtain airbag having an extension and being inflatable from an uninflated position to an inflated position; the curtain airbag being between the roof and the headliner in the uninflated position; the curtain airbag being inflatable downwardly from the headliner to the inflated position; the curtain airbag in the inflated position having a main chamber and the extension extending cross-vehicle from the main chamber and vehicle-forward of the occupant seating area in the inflated position; the curtain airbag includes a second extension extending cross-vehicle from the main chamber in the inflated position, the second extension being vehicle-rearward of the extension; and
a second seat having an occupant seating area and spaced from the seat along the vehicle-longitudinal axis, the curtain airbag having a third extension extending from the main chamber, the third extension being between the seat and the occupant seating area of the second seat in the inflated position, the third extension being vehicle-rearward of the second extension;
the seat including a seatback, the second extension being between the extension and the seatback in the inflated position;
the seatback including a first bolster and a second bolster, the first bolster being inboard of the second bolster with the occupant seating area defined therebetween, and the second extension including an inboard face aligned with the second bolster along the longitudinal axis in the inflated position.

2. The vehicle of claim 1, wherein the extension is elongated cross-vehicle in the uninflated position.

3. The vehicle of claim 2, wherein the headliner has a tear seam elongated cross-vehicle, the tear seam being aligned with the extension.

4. The vehicle of claim 2, further comprising a retractor disposed below the curtain airbag in the uninflated position and a tether extending from the retractor to the curtain airbag.

5. The vehicle of claim 4, wherein the headliner has a tear seam elongated cross-vehicle, the tear seam being aligned with the extension.

6. The vehicle of claim 1, wherein the extension extends cross-vehicle from the main chamber beyond the second extension.

7. The vehicle of claim 1, wherein the seat includes a seat bottom and the seatback includes a top, the second extension extending from the top to the seat bottom in the inflated position.

8. The vehicle of claim 1, wherein the curtain airbag includes a fourth extension extending from the main chamber adjacent to the occupant seating area of the second seat, the fourth extension being vehicle-rearward of the third extension.

9. The vehicle of claim 1, further comprising a retractor disposed below the curtain airbag in the inflated position and a tether extending from the retractor to the curtain airbag.

10. The vehicle of claim 9, wherein the retractor is pyrotechnically actuated.

11. The vehicle of claim 10, further comprising a vehicle body including a middle pillar, the retractor being fixed to the middle pillar.

12. The vehicle of claim 1, further comprising a vehicle body including a middle pillar and a tether connected to the middle pillar and the extension.

13. The vehicle of claim 1, further comprising a vehicle door, the main chamber of the curtain airbag including a first panel facing the vehicle door in the inflated position and a second panel opposite the first panel, the extension extending from the second panel.

14. The vehicle of claim 12, wherein the middle pillar is vehicle-rearward of the extension and the tether extends from the extension to the middle pillar.

15. The vehicle of claim 6, wherein the extension extends from the main chamber to the first bolster and the second extension extends from the main chamber to the second bolster.

16. A vehicle comprising:
a roof;
a headliner;
a seat having an occupant seating area;
a curtain airbag having an extension and being inflatable from an uninflated position to an inflated position;
the curtain airbag being between the roof and the headliner in the uninflated position;
the curtain airbag being inflatable downwardly from the headliner to the inflated position;
the curtain airbag in the inflated position having a main chamber and the extension extending cross-vehicle from the main chamber and vehicle-forward of the occupant seating area in the inflated position;
the curtain airbag includes a second extension extending cross-vehicle from the main chamber in the inflated position, the second extension being vehicle-rearward of the extension; and
a second seat having an occupant seating area and spaced from the seat along the vehicle-longitudinal axis, the curtain airbag having a third extension extending from the main chamber, the third extension being between the seat and the occupant seating area of the second seat in the inflated position, the third extension being vehicle-rearward of the second extension;
the seat including a seatback, the second extension being between the extension and the seatback in the inflated position; and
the seatback including a first bolster and a second bolster, the first bolster being inboard of the second bolster with the occupant seating area defined therebetween, the extension extending cross-vehicle from the main chamber beyond the second extension.

17. The vehicle of claim 16, wherein the extension extends from the main chamber to the first bolster and the second extension extends from the main chamber to the second bolster.

18. The vehicle of claim 16, wherein the second extension includes an inboard face aligned with the second bolster along the longitudinal axis in the inflated position.

19. The vehicle of claim 16, wherein the headliner has a tear seam elongated cross-vehicle, the tear seam being aligned with the extension.

\* \* \* \* \*